(12) United States Patent
Delgrippo, Jr. et al.

(10) Patent No.: US 10,102,512 B1
(45) Date of Patent: Oct. 16, 2018

(54) SYSTEMS AND METHODS FOR FINANCIAL DATA TRANSFER

(71) Applicant: WILMINGTON SAVINGS FUND SOCIETY, FSB, Wilmington, DE (US)

(72) Inventors: Joseph Delgrippo, Jr., West Chester, PA (US); Christopher Zupko, Lumberton, NJ (US); Dale Pippert, Wilmington, DE (US)

(73) Assignee: WILMINGTON SAVINGS FUND SOCIETY, FSB, Newark, DE (US)

( * ) Notice: Subject to any disclaimer, the term of this patent is extended or adjusted under 35 U.S.C. 154(b) by 24 days.

(21) Appl. No.: 14/219,632

(22) Filed: Mar. 19, 2014

Related U.S. Application Data

(60) Provisional application No. 61/803,201, filed on Mar. 19, 2013.

(51) Int. Cl.
| | |
|---|---|
| *G06Q 40/00* | (2012.01) |
| *G06Q 20/14* | (2012.01) |
| *G06Q 20/40* | (2012.01) |

(52) U.S. Cl.
CPC ............ *G06Q 20/14* (2013.01); *G06Q 20/40* (2013.01)

(58) Field of Classification Search
CPC ...... G06Q 40/00; G06Q 20/10; G06Q 20/102; G06Q 20/40
USPC ................... 705/35, 39, 40, 44, 41
See application file for complete search history.

(56) References Cited

U.S. PATENT DOCUMENTS

| | | | |
|---|---|---|---|
| 7,844,519 B2 | 11/2010 | Wehunt et al. | |
| 7,856,386 B2* | 12/2010 | Hazlehurst | G06Q 20/102 705/35 |
| 8,768,838 B1* | 7/2014 | Hoffman | G06Q 40/00 705/44 |
| 2003/0204460 A1 | 10/2003 | Robinson et al. | |
| 2007/0198305 A1 | 8/2007 | Jung et al. | |
| 2007/0255639 A1* | 11/2007 | Seifert | G06Q 10/00 705/36 R |
| 2007/0255652 A1* | 11/2007 | Tumminaro | G06Q 20/10 705/39 |
| 2008/0040265 A1* | 2/2008 | Rackley, III | G06Q 20/02 705/40 |
| 2008/0215377 A1* | 9/2008 | Wottowa | G06Q 40/00 705/4 |
| 2010/0023450 A1* | 1/2010 | Scipioni | G06Q 20/10 705/40 |
| 2010/0280944 A1* | 11/2010 | Low | G06Q 20/102 705/40 |

(Continued)

OTHER PUBLICATIONS

Ivana Stojanovic, "How Can I Copy My MSN Contacts to a New Account?", Yahoo! Answers, printed from http://answers.yahoo.com/questions/index?qid=20090424192428AAK1ILM, dated Apr. 25, 2009 (1 page).
U.S. Appl. No. 13/829,325.
File History of U.S. Appl. No. 13/829,325 electronically captured.
U.S. Appl. No. 13/829,325, filed Mar. 14, 2013 Pending.

*Primary Examiner* — Lalita M Hamilton

(74) *Attorney, Agent, or Firm* — DLA Piper LLP (US)

(57) ABSTRACT

Methods and Systems comprise accessing user account information in a source user account for a first financial institution. Payee data is scraped from the source user account. The payee data is temporarily stored. It is determined whether the user entering the user credential information has logged off the source website. The temporarily stored payee data is inserted into a target user account for a second financial institution.

38 Claims, 13 Drawing Sheets

(56) References Cited

U.S. PATENT DOCUMENTS

| | | | |
|---|---|---|---|
| 2012/0078785 A1* | 3/2012 | Anthony | G06Q 20/108 705/42 |
| 2012/0123932 A1* | 5/2012 | LeCuyer | G06Q 40/02 705/39 |
| 2012/0323717 A1* | 12/2012 | Kirsch | G06Q 20/0855 705/26.1 |
| 2013/0212665 A1 | 8/2013 | Goyal et al. | |
| 2013/0226798 A1* | 8/2013 | Orttung | G06Q 20/027 705/44 |
| 2014/0129429 A1* | 5/2014 | LeCuyer | G06Q 20/26 705/39 |
| 2014/0195416 A1* | 7/2014 | Linscott | G06Q 20/023 705/39 |
| 2014/0244499 A1* | 8/2014 | Gruner | G06Q 20/4014 705/42 |

\* cited by examiner

Message Center

✉ You have 0 new messages

📝 Send a secure message

Help & Related Tasks

- Who can I pay with the online bill payment service?
- How do I setup a new payee?
- How do I edit an existing payee?
- How do I add TD Bank as a Payee?

Services & New Products

Ready to pay bills online?
Bill Pay is FREE and hassle-free.
> Sign up today

Savings help you plan for the future
Find the savings account that fits your life.

800 ←

Payees

Add, Edit or Remove a Payee

| Make a Payment | Manage Payees | Pending Payments | Payment History | Payment Alerts |

- To add a business or organization as a payee, enter its complete name below.
- To add Bank as a payee for a loan or credit account, click here.
- Edit or Delete a payee by clicking on its name Complete Payee Name [            ]    [ Continue ]

Edit Payees

| Name | Account Number | Phone |
|---|---|---|
| Cable-OC | 09508205157023 | 6096416700 |
| CCMUA | 160018479 | 8565413700 |
| COMCAST | 20001311577-01-5 | 8563541660 |
| Commerce Bank Home Equity Line | 000980130658 | 8004937562 |

Figure 8

Bill payee table example

| Transfer ☑ | Payee | Results |
|---|---|---|
| ☑ | ⓘ ARTESIAN WATER COMPANY<br>Account #:12345 | Ready to import |
| ☑ | ⓘ Conectiv Power Delivery<br>Account #:3111576999 | Ready to import |
| ☑ | ⓘ DelGrippo Home Improvement<br>Account #:246810 | Ready to import |
| ☑ | ⓘ JC PENNY - REGULAR<br>Account #:345678 | Ready to import |
| ☑ | ⓘ NEW JERSEY AMERICAN WATER<br>Account #:97655432 | Ready to import |
| ☑ | ⓘ PHILADELPHIA NEWSPAPERS INC<br>Account #:38475900000008938792 | Ready to import |
| ☑ | ⓘ PIPPERT and CO.<br>Account #:3438374747 | Ready to import |
| ☑ | ⓘ WILMINGTON COUNTRY CLUB<br>Account #:38752893475289734589273 | Ready to import |
| ☑ | ⓘ WALMART<br>Account #:987654321 | Ready to import |
| ☑ | ⓘ ZUPKO INC<br>Account #:123456789 | Ready to import |

Make Payments

| Accounts | Transfer Funds | Make Payments | Customer Service |

Before your payment is processed, we verify the balance of the funding account. If you don't have sufficient funds in that account on the date your payment is scheduled, our payment may be delayed or canceled.

1 Welcome. Let's make your first payment.
Start by entering who you want to pay below.

Pay someone new: Enter person or business name [Add] Find: [Search my payee list]

Pay To  Amount  Send On

You have no payees yet. Add them above.

View payees:

| Make payments | Make Payments |
|---|---|
| Manage bill payment categories | Before your payment is processed, we verify the balance of the funding account. If you don't have sufficient funds in that account on the date your payment is scheduled, our payment may be delayed or canceled. |
| View bill payment reports | |
| Search bill payment records | Pay someone new: [Enter person or business name] [Add]  Find: [Search my payee list] |

| Pay To | Amount | Send On |
|---|---|---|
| Show all payees ▼ sorted by name ▼ | Pay from: **COMMERCIAL CHEC...*9738** ▼ Available: $0.00 | |
| **\*NEW JERSEY AMERICAN WATER, \*5432** ▼ Set up: reminder \| autopay    Add memo | $ [     ] | [01/28/2013] [Pay] Deliver by: 02/01/2013 |
| **\*PHILADELPHIA NEWSPAPERS.... \*8792** ▼ Set up: reminder \| autopay    Add memo | $ [     ] | [01/28/2013] [Pay] Deliver by: 02/01/2013 |
| **\*PIPPERT and CO., \*4747** ▼ Set up: reminder \| autopay    Add memo | $ [     ] | [01/28/2013] [Pay] Deliver by: 02/01/2013 |
| **\*WALMART, \*4321** ▼ Set up: reminder \| autopay    Add memo | $ [     ] | [01/28/2013] [Pay] Deliver by: 02/01/2013 |
| **\*ZUPKO INC, \*6789** ▼ Set up: reminder \| autopay    Add memo | $ [     ] | [01/28/2013] [Pay] Deliver by: 02/01/2013 |
| **Artesian, \*2345** ▼ Set up: reminder \| autopay    Add memo | $ [     ] | [01/28/2013] [Pay] Deliver by: 02/01/2013 |
| Atlantic City Electric, *6000 ▼ | $ [     ] | [01/28/2013] [Pay] |

Quick Links:
Account activity
Make a transfer

Figure 12

SYSTEMS AND METHODS FOR FINANCIAL DATA TRANSFER

CROSS-REFERENCE TO RELATED APPLICATIONS

This application claims the benefit of U.S. Provisional Patent Application No. 61/803,201, filed Mar. 19, 2013, which is incorporated by reference in its entirety.

BRIEF DESCRIPTION OF THE DRAWINGS

FIGS. 6-13 are user interfaces according to an embodiment of the invention.

DETAILED DESCRIPTION OF SEVERAL EMBODIMENTS

Figure 1:
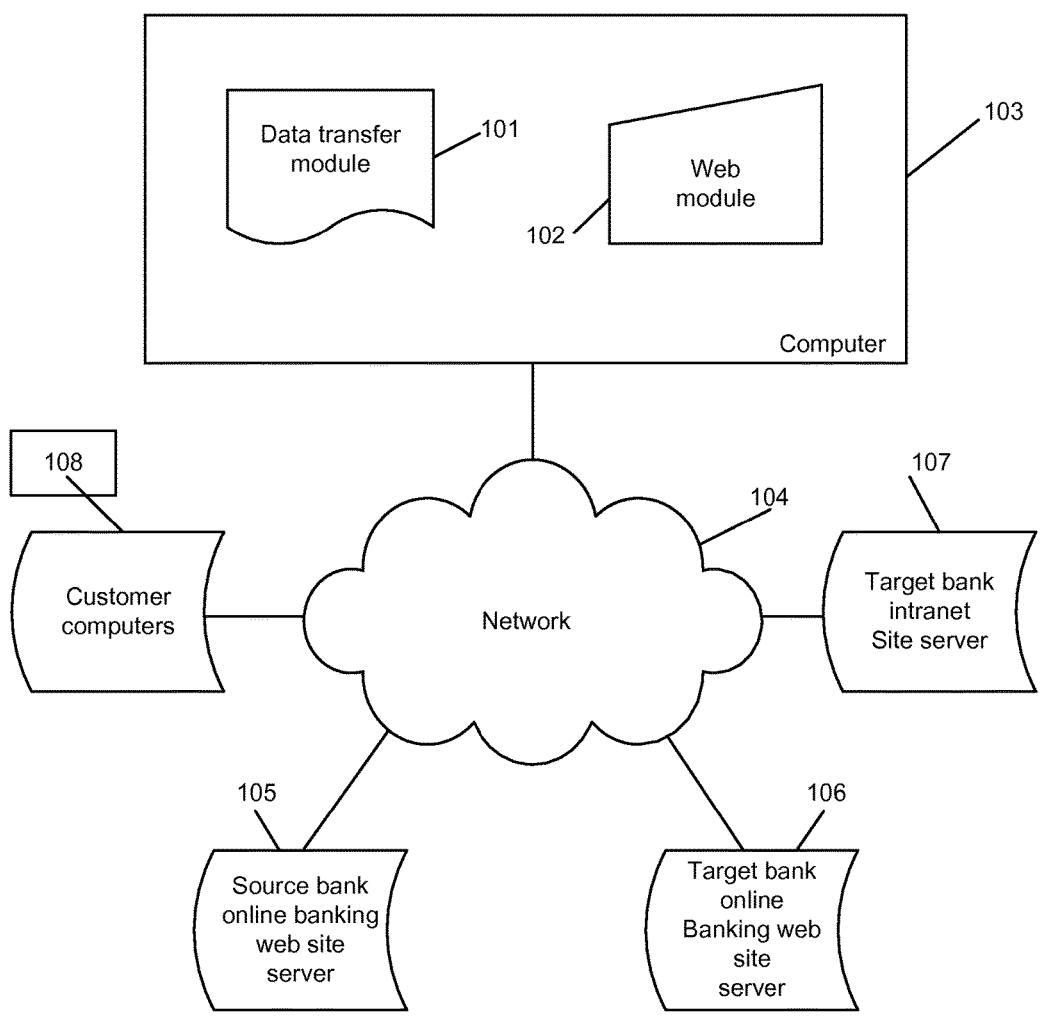
FIG. 1 is a data transfer system according to an embodiment of the invention.

Many banks and other financial institutions may have an online banking web presence, which may provide customers with an ability to pay bills electronically. Methods and systems described herein may enable transfer of banking customer online bill pay account information from one financial institution (a source bank) to another (a target bank). Financial institutions may include retail banks, credit unions, savings and loans, and/or other institutions. Financial institutions may be referred to as banks herein, though those of ordinary skill in the art will appreciate that the systems and methods disclosed may be applicable to other types of financial institutions. Any bill payee information made available from the source bank's online banking web site may be a candidate for transfer, including but not limited to: payee name, account number, full address, payee nickname, payment category, phone number, payment history, other data, or any combination thereof. In an embodiment, automated secure transfer of bill payee information may save a customer from having to manually rekey bill pay contacts when switching from one financial institution to another. In an embodiment, a system transferring the information may have no knowledge of, or capability of knowing, the customer credentials such as usernames, passwords, personal information, security data, or any combination thereof in use at either institution.

Online banking web sites and their backend databases may be proprietary and closed. These online banking sites may allow a user to enter, update, or delete bill pay contact information, one at a time. For a variety of reasons, there may come a time when a customer with a source bank desires to switch their deposit accounts to either a different target bank, or to a different account with the same bank (which, in an embodiment, may also be referred to a target bank as described herein). The systems and methods described herein may allow a target bank to automatically assist in moving a customer's bill payees from the source bank to the target bank. In addition, the systems and methods described herein may be employed even if the source and target banks are the same bank, for example when a customer may wish to move their bill pay contacts between accounts within the same institution. The same can be said for historical payment history as well.

Systems and methods described herein may comprise one or more computers. A computer may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, smartphones, tablets and other terms. Computers may facilitate communications between users, may provide databases, may perform analysis and/or transformation of data, and/or perform other functions. It will be understood by those of ordinary skill that those terms used herein are interchangeable, and any computer capable of performing the described functions may be used. For example, though the term "server" may appear in the following specification, the disclosed embodiments are not limited to servers.

Computers may be linked to one another via a network or networks. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via Wi-Fi, WiMax, or other wireless connection). Connections between computers may use any protocols, including connection oriented protocols such as TCP or connectionless protocols such as UDP. Any connection through which at least two computers may exchange data can be the basis of a network.

FIG. 1 is a data transfer system 100 according to an embodiment of the invention. Users of this system 100 may include customers, associates, employees, consultants, and/or representatives of financial institutions, for example. The system 100 may include a computer 103 comprising various hardware and software elements. For example, the computer 103 may include a data transfer module 101 and a web module 102. The web module 102 may interface with a network 104 and may operate under the control of the data transfer module 101. The network 104 may be a public network such as the internet, a private network such as a target bank intranet, or a combination thereof. The data transfer module 101 may work with the web module 102 to export bill payee information from a customer's source bank and import this information into a target bank. In one example, the data transfer module 101 may comprise a JavaScript program running in a commercial off-the-shelf web browser; the web module 102 may comprise a separate instance of the web browser, and the web module 102 may be controlled as an out-of-process ActiveX/COM server by the data transfer module 101. In another example, the data transfer module 101 may comprise a Java program utilizing a third party library such as Selenium to interface with and control the web module 102. In still another example, the data transfer module 101 may comprise a desktop application built using a compiled programming language, and the web module 102 may comprise an embedded component or "web control" running in the context of the same application. The modules described above and/or other modules may comprise any combination of hardware and/or software within the system 100 which may be used to perform the tasks described below.

The computer 103 may be in communication with a source bank online banking web site server 105, a target bank online banking web site server 106, and/or a target bank intranet site server 107 via the network 104. In some cases, the a source bank online banking web site server 105 and the target bank online banking web site server 106 may be the same server, for example when a customer is transferring data between accounts with the same bank. As described in greater detail below customer credentials may not be shared except between the customer and the banks via customer interaction with the source bank online banking web site server 105 and/or the target bank online banking web site server 106. The customer may access these servers 105/106 using a customer computer 108 via the network 104. Transfer of customer credentials over the network 104 may be secure, for example via an industry standard SSL protocol (HTTPS) or other secure method. The data transfer module 101 may not take in customer credentials and may have no way to know or learn what the customer's credentials are.

The data transfer module 101 of the computer 103 may perform data transfer on behalf of the target bank. A customer may interact with the web module 102 via the network 104 to enter their credentials for both the source bank online banking web site server 105 and the target bank online banking web site server 106. The web module 102 may display login pages for the source bank online banking web site server 105 and the target bank online banking web site server 106 so that the user may enter credentials directly into the login pages, rather than entering the credentials into the computer 103. The data transfer module 101 may interface programmatically with the web module 102, for example by sending commands to and receiving responses from the web module 102. The web module 102 may expose enough of its internal representation of web pages so that the data transfer module 101 is able to perform the various functions described below. The web module 102 may be capable of processing HTML/XHTML, with embedded CSS and JavaScript over the HTTPS protocol for example, and may also be able to use other network communication techniques. Those of ordinary skill in the art will recognize that there are multiple versions of HTML/XHTML, CSS, JavaScript, and HTTPS protocol in widespread use. The web module's 102 support for these and/or other technologies may comprehensive enough to enable the computer 103 to interact correctly with web pages from various online banking web sites employing various and/or changing network communication techniques.

Figure 2:
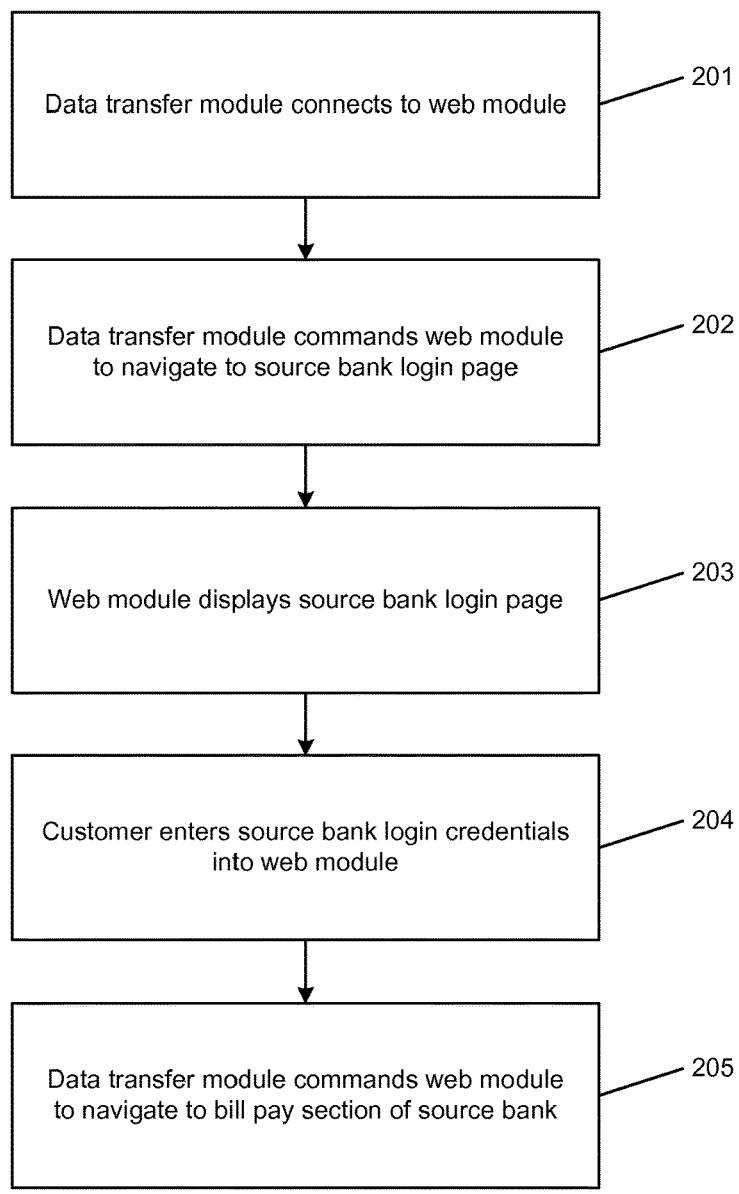
FIG. 2 is a method for navigating to a page according to an embodiment of the invention.

FIG. 2 is a method 200 for transferring account information according to an embodiment of the invention. Prior to performance of this method 200, a customer of the source bank may decide to transfer their accounts and history for bill pay (e.g., a checking account) to a different account with the same or different bank (i.e., the target bank). The computer 103 including the data transfer module 101 may be owned, operated, and/or used on behalf of the target bank. The customer may set up an account with the target bank. The customer may enroll in online banking for the account with the target bank, which may include agreeing to whatever compliance and/or eSign documents the target bank may require. In some cases, the customer may have already established an account and online banking with the target bank in the past. In any case, the customer may have accounts with the source bank and the target bank.

Figure 6:
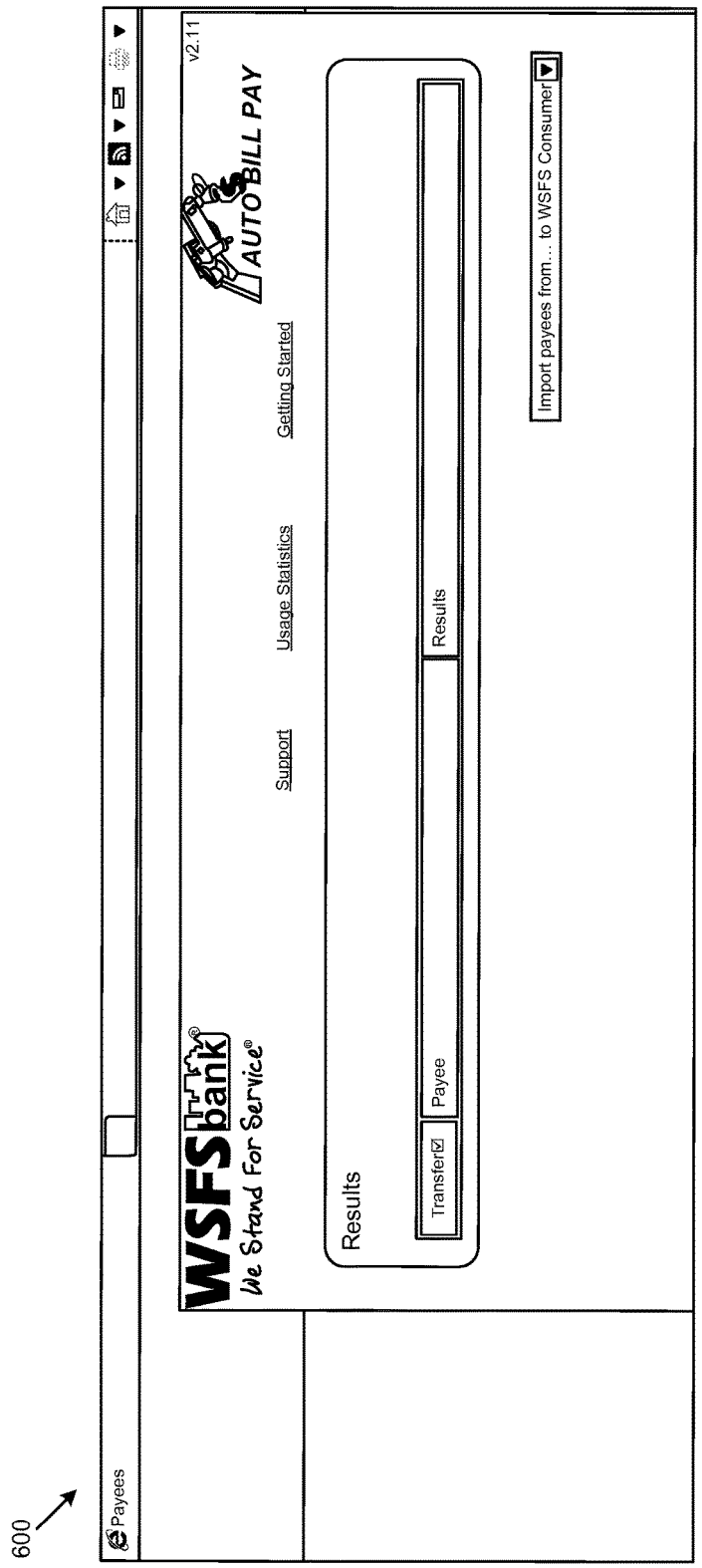

When a customer has accounts with the source bank and the target bank, the system 100 may be used to perform data transfer. In one example, the customer may call and/or visit a nearby branch of the target bank. The customer and/or a representative of the target bank may activate the data transfer module 101 using the computer 103 which may be accessible from an office within the target bank. In one example, a program may first be downloaded to the computer 103 from the target bank's intranet site 107 to enable use of the data transfer module 101. The data transfer module 101 may present a graphical user interface (GUI) or other interface to the user, illustrating, for example, the payees, whether or not a transfer of the payee information should be attempted, and the results of the attempt. FIG. 6 presents an example GUI 600. Via the interface, the user may select their source bank, for example by choosing one of a plurality of supported source banks.

Returning to FIG. 2, the customer's source bank is then chosen, and the method 200 may be performed. In 201, the data transfer module 101 may connect to the web module 102. In 202, the data transfer module 101 may command the web module 102 to navigate to the login page for the chosen source bank's online banking web site, which may be hosted by the source bank server 105, for example. In an embodiment of the invention, the data transfer module 101 may be a JavaScript program running inside a web browser, while the web module 102 may be a separate web browser running out-of-process from the web browser hosting the JavaScript program. The JavaScript program may use ActiveX calls against the web module's web browser object model, in order to command the web module's web browser to navigate to the URL for the source bank's login page.

Figure 7:
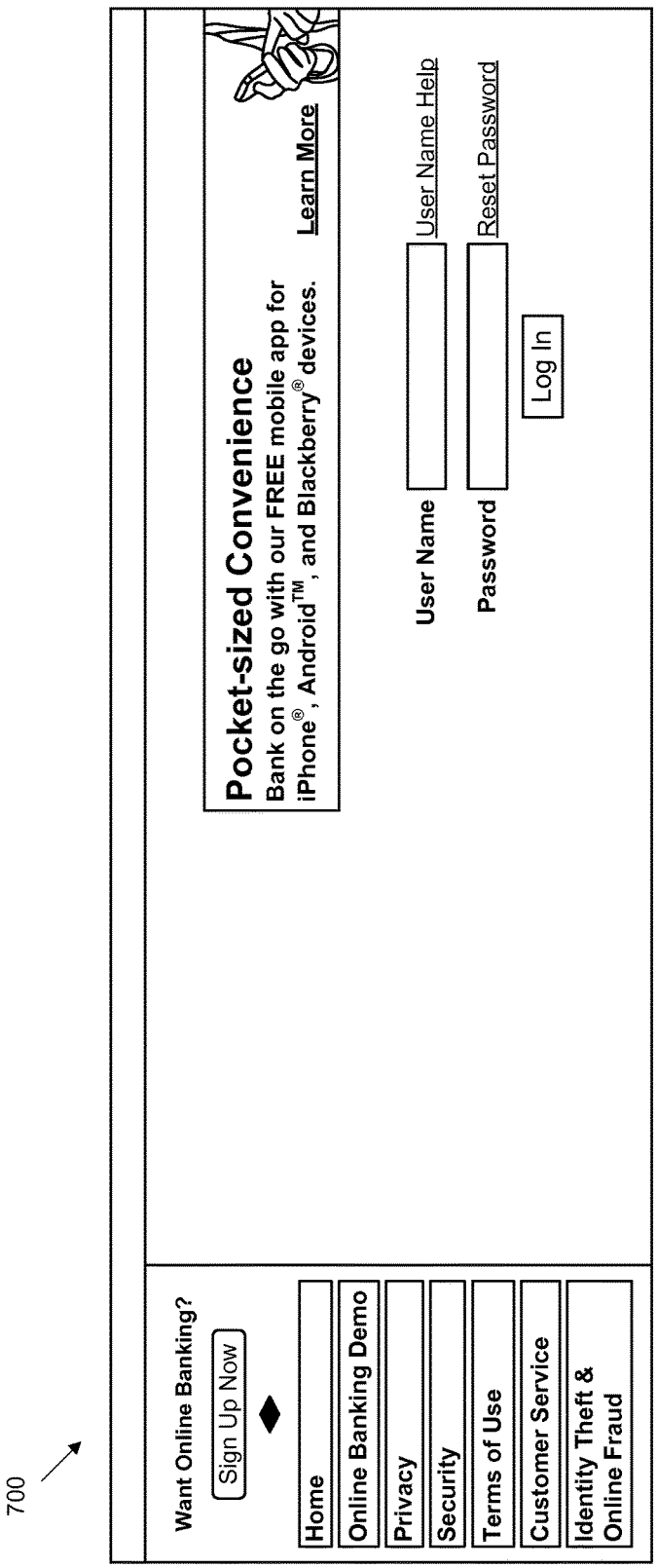

The user may be able to interact with the web module 102 via a GUI or other interface. In 203, the web module 102 may cause a source bank login page to be displayed to the user. FIG. 7 presents an example login page 700 illustrating a user name and password. This login page may be hosted by the source bank server 105, for example. Returning to FIG. 2, in 204, the source bank's online banking web site may receive the customer's source bank login credentials via the web module 102 and network 104. The credentials may include username, password, personal data, security out-of-wallet questions, or any combination thereof, for example. The data transfer module 101 may wait until it detects that the customer has successfully logged in using a predetermined wait time. In an embodiment of the invention, the data transfer module 101 may interrogate the object model of the currently loaded HTML page in the web module 102, and, via JavaScript code running in the data transfer module 101, may check for the presence of a "Log Out" or "Log Off" button or hyperlink element, in a predetermined location on the page, thus indicating that the customer has successfully logged in to their online banking account.

Figure 13:
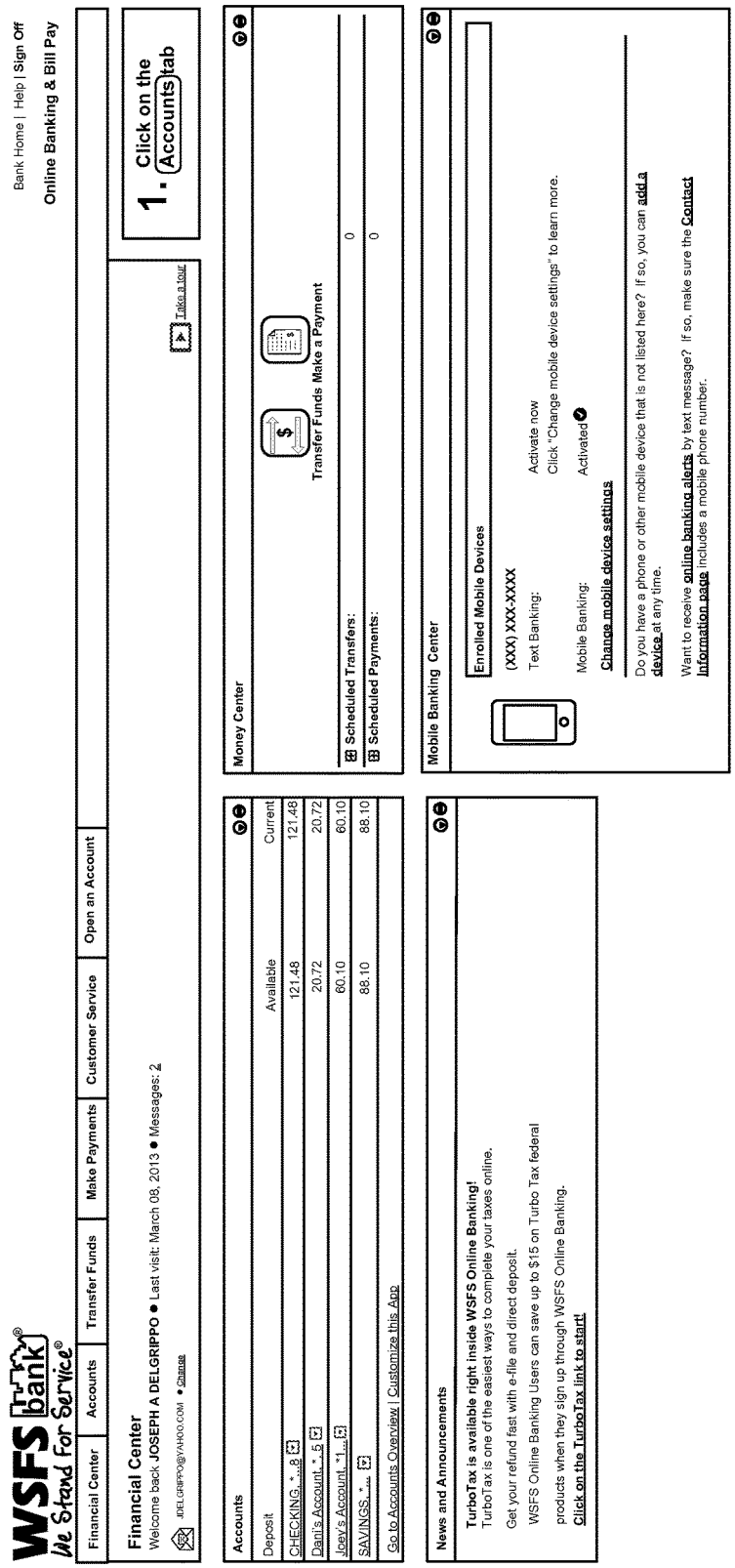

FIGS. 8 and 13 presents examples of displays 800 and 1300 that may be shown once a user successfully logs in, where payee information may be managed. These figures illustrate bill pay manager pages for a user for various entities' (e.g., banks) web sites. Returning to FIG. 2, in 205, the data transfer module 101 may then command the web module 102 to navigate to the bill pay section of the source bank's online banking web site. In order to do this, in an embodiment, the program running in the data transfer module 101 may be coded with knowledge of the specific URL that may be navigated to, for the source bank, in order to command the web module 102 to enter the bill pay section of the source bank website.

FIG. 9 presents an example bill pay section 900, where various payees whose bills are set up to be paid automatically are listed with their corresponding account numbers. In an embodiment of the invention, the data transfer module 101 may include a visual representation of the collected bill payees, as shown in FIG. 9. As each payee is scraped from the source bank, it may be stored to internal RAM memory of the data transfer module 101, and added to the user interface table of FIG. 9. In addition to the payee name, the data transfer module 101 program may be configured to display additional details for the payee, such as their account number. The data transfer module 101 may also include a feature to allow the customer to make selections as to which payees they chose to transfer to the target bank, and which to elide.

Figure 3:
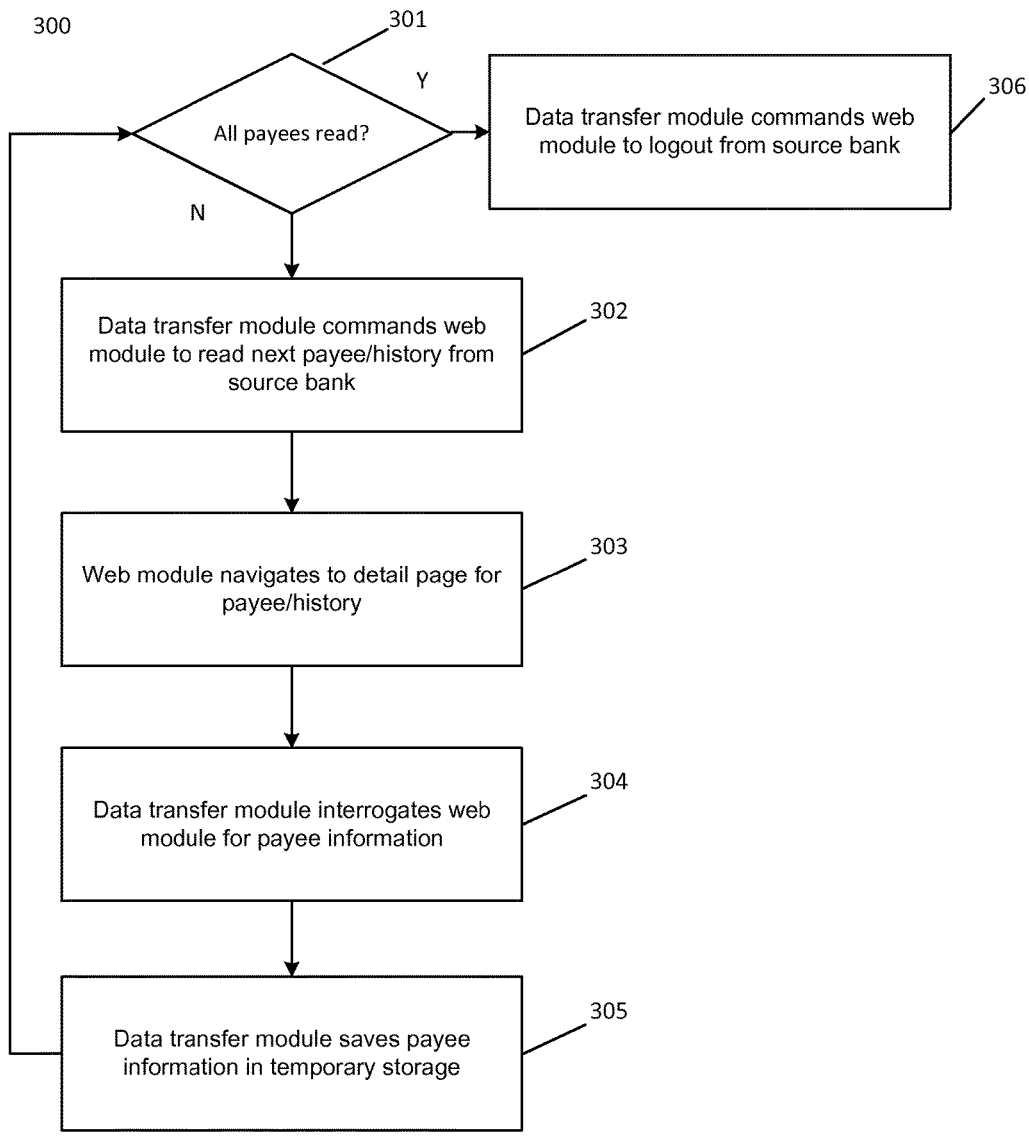
FIG. 3 is a method for acquiring data according to an embodiment of the invention.

FIG. 3 is a method 300 for acquiring data according to an embodiment of the invention. Once a successful login has occurred, the computer 103 may acquire bill pay data from the source bank. Bill pay centers on the source bank web site may be organized in some type of ledger fashion, usually where one bill payee is listed after another in a table. In some sites all payees may be listed on one page; in other bank sites payees may be split across more than one page (e.g., each page may only contain 10 bill payees or so). The data transfer module 101 may have programmed knowledge of the source bank HTML layout with respect to this table or tables of bill payees, as well as the URL(s) necessary to navigate to the detail page for each bill payee, and therefore may be able to command the web module, programmatically, to navigate to each bill payee, one at a time. Details for each bill payee may be made available, then, by the source bank web site, one at a time, once the data transfer module navigates to the URL for each payee.

The bill pay data may include one or more payees, each of which may have its own associated payee data (for example when a bill is to be paid, bill amounts, bill payee identification, account number, or other data, or any combination thereof). In 301, the data transfer module 101 may determine whether there are any payees for which data must be read. The data transfer module 101 may iterate through the customer's source bank bill payees. If there are one or more payees to be examined, in 302 the data transfer module 101 may cause the web module 102 to read the next payee from the source bank. In 303, the web module 102 may navigate to a detail page for the payee, which may comprise payee data. In 304, the data transfer module 101 may retrieve payee information via the web module 102. Once the data transfer program has programmatically commanded the web module 102 to the specific detail page for a given bill payee, the data transfer module's program may then "scrape" the page for its bill payee details such as name, address, phone number, account number. Values for each of these pieces of information are generally available as textbox, label, or other similar HTML controls.

In 305, in an embodiment, the data transfer module 101 may save the retrieved payee information, for example in a temporary storage and/or in permanent storage. In other embodiments, the retrieved payee information is not saved. For example, the data transfer module's program may scrape each bill payee detail screen from the web module 102, the payee detail may be held strictly within internal RAM variables and data structures within the data transfer module's program. In an embodiment, at no time is this bill payee detail information stored (e.g., written to disk or persistently stored, etc.). After retrieving information for a payee, the data transfer module 101 may return to 301 and determine whether more payees remain to be read. When all bill payees for the customer have been read from the source bank online banking web site, in 306 the data transfer module 101 may command the web module 102 to logout from the source bank web site. In some embodiments the data transfer module 101 may display a list of bill payees read from the source bank to the user. As shown in FIG. 9, the user may have the ability to select payees to skip as candidates for import into the target bank via the GUI or other interface.

Figure 4:
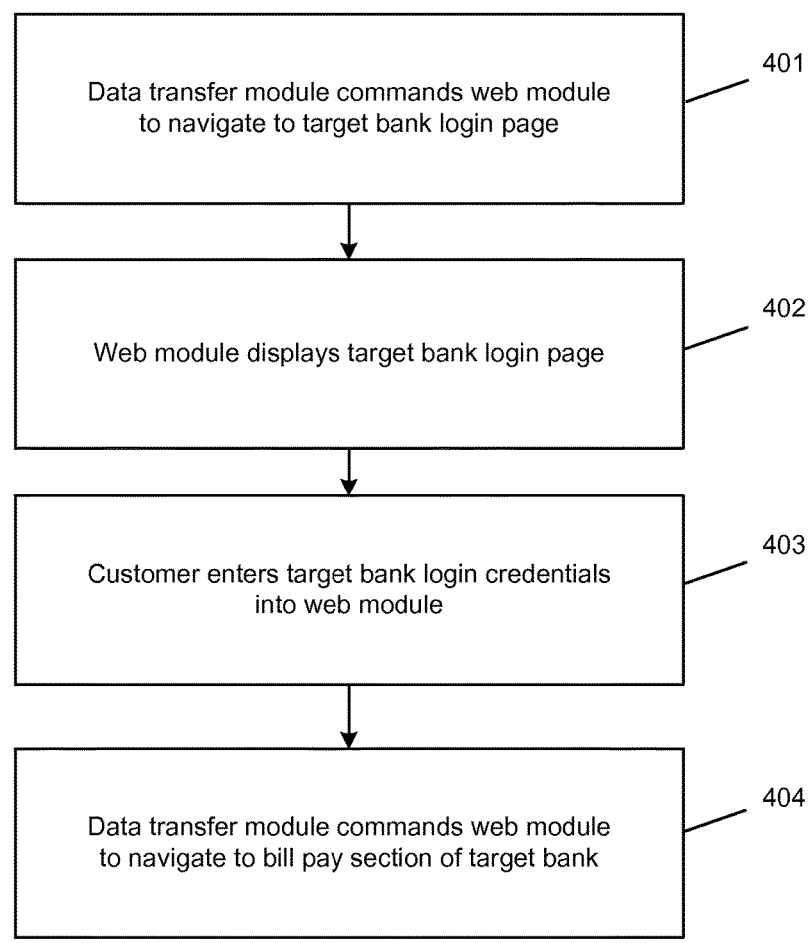
FIG. 4 is a method for navigating to a page according to an embodiment of the invention.
Figure 10:
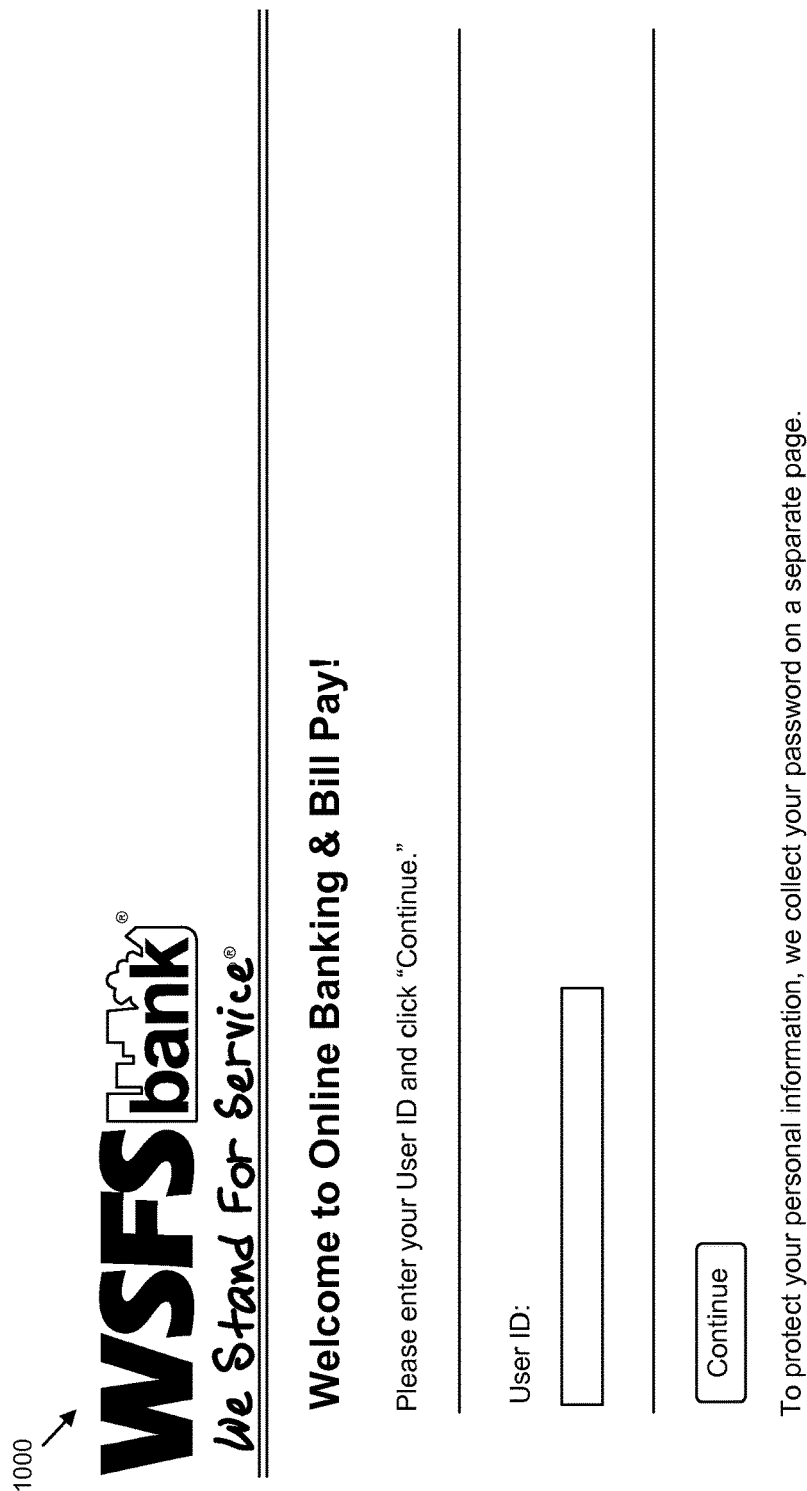

FIG. 4 is a method 400 for navigating to a page according to an embodiment of the invention. After the web module 102 has logged out from the source bank web site, in 401 the data transfer module 101 may command the web module 102 to navigate to the target bank login page. Returning to FIG. 4, in 402, the web module 102 may display the target bank login page to the user. FIG. 10 presents an example login page 1000. In 403, the target bank's online banking web site and/or target bank intranet site server 107 may receive the customer's source bank login credentials via the web module 102 and network 104. In an embodiment of the invention, the data transfer module 101 may be a JavaScript program running inside a web browser, while the web module 102 may be a separate web browser running out-of-process from the web browser hosting the JavaScript program. The JavaScript program may use, for example, ActiveX calls against the web module's web browser object model, in order to command the web module's web browser to navigate to the URL for the target bank's login page. Once the web module 102 arrives at the target bank login page, the customer may then type in their credentials (e.g., username and password) directly with the secure connection established by the web module 102 with the target bank web site. In an embodiment, at no time does the data transfer module 101 have knowledge of or awareness of the customer doing the typing.

The data transfer module 101 may wait until it detects that the customer has successfully logged in. In 404, the data transfer module 101 may then command the web module 102 to navigate to the bill pay section of the target bank's online banking web site or intranet page. In order to do this, in an embodiment, the program running in the data transfer module 101 may be coded with knowledge of the specific URL that must be navigated to, for the target bank, in order to command the web module 101 to enter the bill pay section of the target bank website.

FIG. 11 presents an example bill pay section ready to receive entries 1100, where the entries may be added in manually and/or searched in the user's account.

Figure 5:
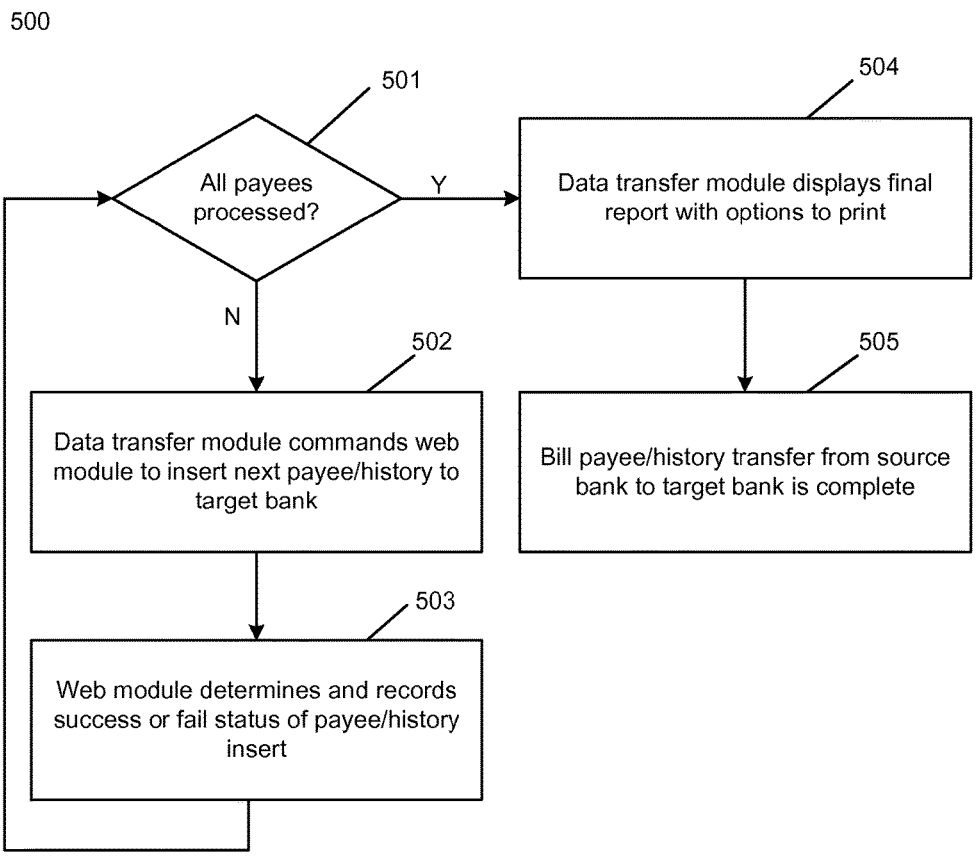
FIG. 5 is a method for importing data according to an embodiment of the invention.

FIG. 5 is a method 500 for importing data according to an embodiment of the invention. Once a successful login has occurred, in 501 the data transfer module 101 may check the cached list of payees pulled from the source bank. If there is at least one payee that is not known to the target bank, in 502 the data transfer module 101 may command the web module 102 to insert the payee into the target bank. Inserting the payee may include providing and formatting all data about the payee scraped according to the process 300 of FIG. 3 described above. In some cases, the import to the target bank may be conducted using an application programming interface (API) into the target bank. In 503, the data transfer module 101 may determine if the insert was successful or not, for example by capturing any error messages returned from the target bank. FIG. 12 presents an example bill pay section which has been successfully filled in 1200. In this figures, the payee entities are listed with the appropriate action (e.g., reminder, autopay), the amount, and date information. Returning to FIG. 5, the data transfer module 101 may then return to 501 and determine if there are more payees to enter. When all payees have been processed, in 504 the data transfer module 101 may display a final report to the user, and may provide an option to print the report to the user. The report may indicate whether the transfers were successful. The report may include information about any unsuccessful transfers, for example an indication of which payees did not transfer and a reason for transfer failure. The reason for transfer failure may be based on an error code or message returned from the target bank, as described above. In 505, the data transfer module 101 may determine that the bill payee transfer from source bank to target bank is complete.

After bill payee transfer is complete, the customer may retain bill pay schedules from the source bank in the target bank and/or may create new schedules. In some cases, actual bill pays may not be scheduled by the data transfer module 101. Setting up payment schedules, if so desired, may be done manually by the customer, using whatever capabilities are offered by the target bank's bill pay web site. This can be done any time after the transfer has completed.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, while the above examples are presented in the context of OPSs 200 connecting to nodes 150, it will be understood that the systems and methods described herein can be performed by any interconnected computers. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:
   accessing, with a web module in communication with a processor and a network, user account information in a source user account for a first financial institution via a source website using user-entered user credential information for the first financial institution, the user-entered user credential information comprising log in information, and the user account information comprising payee data comprising existing automatic bill pay information;
   scraping, with a data transfer module in communication with the processor and the network, the payee data from the source user account;
   temporarily storing, with the data transfer module, the payee data into a memory in communication with the data transfer module;
   determining, with the data transfer module, whether the user entering the user credential information has logged off the source website by checking for a presence of a log off or log out element on the source website page, wherein the presence of the log off or log out element indicates that the user has not logged off the source website; and
   inserting, with the data transfer module, temporarily stored payee data into a target user account for a second financial institution different from the first financial institution, the inserting performed via a target website or a target intranet site.

2. The method of claim 1, further comprising:
   navigating, with the web module, to the source web site; and
   sending, with the web module, the user credential information to the source web site via the network; wherein the data transfer module does not have access to the user credential information.

3. The method of claim 2, wherein the user credential information also comprises a username, a password, personal information, security data, or any combination thereof.

4. The method of claim 2, further comprising deleting, with the web module, the user credential information from the memory in communication with the web module.

5. The method of claim 1, further comprising:
   navigating, with the web module, to the target website; and
   sending, with the web module, the user credential information to the target website via the network; wherein the data transfer module does not have access to the user credential information.

6. The method of claim 5, wherein the user credential information further comprises a username, a password, personal information, security data, or any combination thereof.

7. The method of claim 5, further comprising deleting, with the web module, the user credential information from a memory in communication with the web module.

8. The method of claim 1, further comprising:
   generating, with the data transfer module, a report associated with the inserting of the temporarily stored payee data into the target account; and
   causing, with the data transfer module, the report to be displayed.

9. The method of claim 8, wherein the report comprises information about a failed insertion of the temporarily stored payee data into the target account.

10. The method of claim 8, wherein the report comprises an indication of whether the insertion of the temporarily stored payee data into the target account was successful or unsuccessful.

11. The method of claim 8, further comprising deleting, with the data transfer module, the report from the memory in communication with the data transfer module.

12. The method of claim 1, further comprising:
    receiving, with the data transfer module, a selection of a subset of the temporarily stored payee data; and
    removing, with the data transfer module, the subset of the temporarily stored payee data from the temporarily stored payee data before performing processing associated with inserting, with the data transfer module, the temporarily stored payee data into the target account.

13. The method of claim 1, wherein the user is guided to the existing automatic bill pay information by the data transfer module.

14. The method of claim 1, wherein the existing automatic bill pay information and/or the user-entered user credential information is/are not permanently stored by the data transfer module.

15. The method of claim 1, further comprising:
displaying the log in page of the first financial institution so that the user can enter in the user credential information into the log in page of the first financial institution.

16. The method of claim 1, wherein the web module stores layout information related to the source website.

17. The method of claim 1, wherein the second financial institution does not have knowledge of the user credential information for the first financial institution.

18. The method of claim 1, wherein scraped automatic payment information is not modified before it is repopulated at the target website.

19. The method of claim 1, further comprising:
repopulating scraped automatic payment information at the target website; and
destroying the scraped automatic payment information.

20. The system of claim 1, wherein the data transfer module is further configured for:
repopulate scraped automatic payment information at the target website; and
destroy the scraped automatic payment information.

21. A system comprising:
a processor;
a memory;
a web module in communication with the processor and a network, the web module being configured to:
access user account information in a source user account for a first financial institution via a source website using user-entered user credential information for the first financial institution, the user-entered user credential information comprising log in information, and the user account information comprising payee data comprising existing automatic bill pay information; and
a data transfer module in communication with the processor, the memory, and the web module, the data transfer module being configured to:
scrape the payee data from the source user account for a first financial institution via a source web site;
temporarily store the payee data into the memory;
determine, with the data transfer module, whether the user entering credential information has logged off the source website by checking for a presence of a log off or log out element on the source website page, wherein the presence of the log off or log out element indicates that the user has not logged off the source website; and
insert temporarily stored payee data into a target user account for a second financial institution different from the first financial institution, the inserting performed via a target web site or a target intranet site.

22. The system of claim 21, wherein:
the web module is configured to:
navigate to the source web site; and
send the user credential information to the source web site via the network; and
the data transfer module does not have access to the user credential information.

23. The system of claim 22, wherein the user credential information also comprises a username, a password, personal information, security data, or any combination thereof.

24. The system of claim 22, wherein the web module is further configured to delete the user credential information from the memory in communication with the web module.

25. The system of claim 21, wherein:
the web module is configured to:
navigate to the target web site; and
send the user credential information to the target web site via the network; and
the data transfer module does not have access to the user credential information.

26. The system of claim 25, wherein the user credential information comprises a username, a password, personal information, security data, or any combination thereof.

27. The system of claim 25, wherein the web module is further configured to delete the user credential information from a memory in communication with the web module.

28. The system of claim 21, wherein the data transfer module is further configured to:
generate a report associated with the inserting of the temporarily stored payee data into the target account; and
cause the report to be displayed.

29. The system of claim 28, wherein the report comprises information about a failed insertion of the temporarily stored payee data into the target account.

30. The system of claim 28, wherein the report comprises an indication of whether the insertion of the temporarily stored payee data into the target account was successful or unsuccessful.

31. The system of claim 28, wherein the data transfer module deletes the report from the memory in communication with the data transfer module.

32. The system of claim 21, wherein the data transfer module is further configured to:
receive a selection of a subset of the temporarily stored payee data; and
remove the subset of the temporarily stored payee data from the temporarily stored payee data before performing processing associated with inserting temporarily stored payee data into the target account.

33. The system of claim 21, wherein the user is guided to the existing automatic bill pay information by the data transfer module.

34. The system of claim 21, wherein the existing automatic bill pay information and/or the user-entered user credential information is/are not permanently stored by the data transfer module.

35. The system of claim 21, wherein the web module is further configured to:
display the log in page of the first financial institution so that the user can enter in the user credential information into the log in page of the first financial institution.

36. The system of claim 21, wherein the web module stores layout information related to the source website.

37. The system of claim 21, wherein the second financial institution does not have knowledge of the user credential information for the first financial institution.

38. The system of claim 21, wherein scraped automatic payment information is not modified before it is repopulated at the target website.

* * * * *